Nov. 22, 1966  J. P. VALANCIUS  3,287,623
VOLTAGE REGULATOR
Filed July 29, 1963
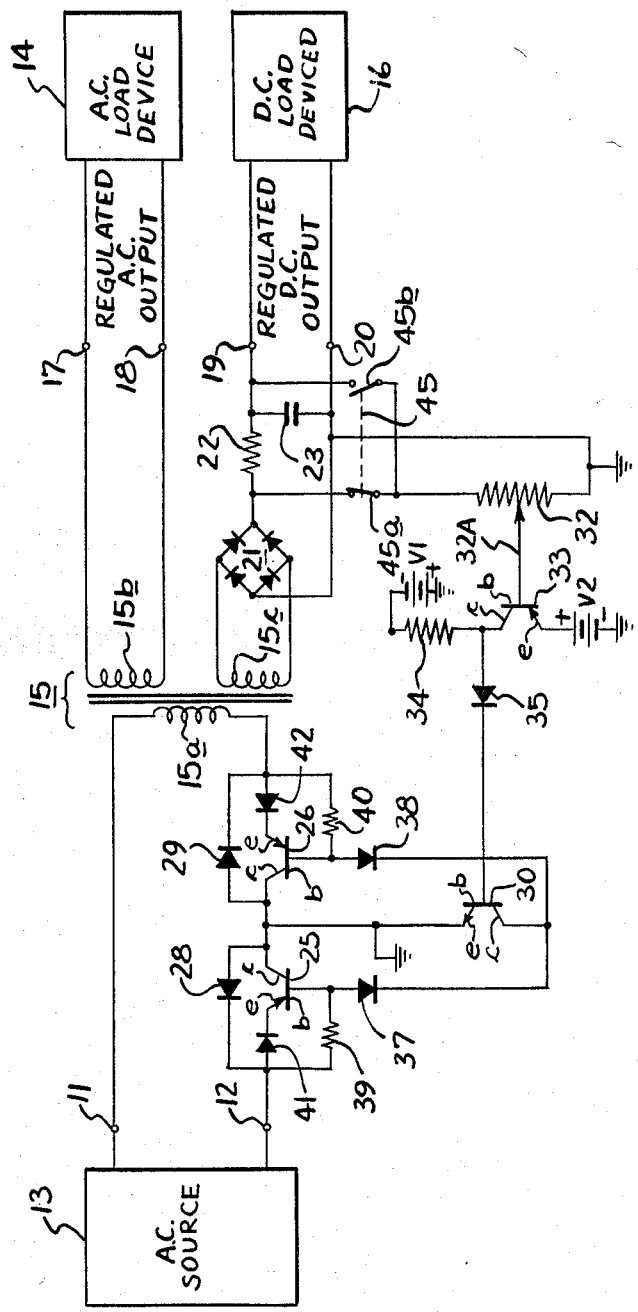
INVENTOR.
JAMES P. VALANCIUS
BY
Wolfe, Hubbard, Voit & Osann
ATTYS.

United States Patent Office 3,287,623
Patented Nov. 22, 1966

3,287,623
VOLTAGE REGULATOR
James P. Valancius, Chicago, Ill., assignor to Packard Instrument Company, Inc., Lyons, Ill., a corporation of Illinois
Filed July 29, 1963, Ser. No. 298,334
7 Claims. (Cl. 323—22)

The present invention relates to a voltage regulator and more specifically to a voltage regulator for automatically regulating the amplitude of an A.-C. or D.-C. output derived from an A.-C. supply.

Precision voltage regulating devices are well known and are used extensively in circuits which require minimum changes in an output voltage applied to a load or utilization device. The purpose of voltage regulation is to keep the output voltage supplied to the load constant despite changes in load current or changes in input voltage, both of which tend to change the output voltage. It is conventional in certain types of alternating current voltage regulation to employ a regulating device, connected in series between a load and a source, to control the flow of current therethrough. In such applications, a regulating signal proportional to any departure of the output voltage from a desired value is applied to the regulating device so that the series resistance or impedance of the device is increased or decreased, and the voltage drop thereacross increased or decreased, when the output voltage rises above or falls below the desired value. Typical regulating devices connected in series between an A.-C. source and a load are saturable reactors and vacuum tubes. A saturable reactor may be utilized to provide efficient and accurate control of the alternating current voltage across a load. However, due to the inherent nature of a saturable reactor, wave form distortion is always present in the output voltage supplied by the saturable reactor to the load. In addition, vacuum tubes and saturable reactors are often not capable of producing the precision regulation often required, and the size and expense of such components render them undesirable especially in miniaturized equipment.

A primary object of the present invention is to provide a transistorized voltage regulator for an A.-C. supply which is characterized in its improved operating characteristics. In this connection, an object is to provide a novel voltage regulator for automatically regulating the amplitude of an A.-C. or D.-C. output derived from the A.-C. supply. Another object of the present invention is to provide a transistorized alternating current voltage regulator utilizing the principles of series type regulation to provide precision voltage regulation.

Still another object of the present invention is to provide a new and improved voltage regulator capable of satisfactory performance over a wide range of operating conditions. A related object of this invention is to provide a novel alternating current voltage regulator which is accurate in the face of frequency changes in the input. Another related object is to provide such an alternating current voltage regulator which is stable and accurate over an extended period of operation.

A general object of the present invention is to provide a novel alternating current voltage regulator characterized in its uniformity, repeatability, efficiency, reliability and economy of operation.

While the invention has been shown and will be described in some detail with reference to a particular, exemplary embodiment thereof, there is no intention that it be limited to such detail. On the contrary, it is intended here to embrace all modifications, alternatives and equivalents falling within the spirit and scope of the invention as defined by the appended claims.

Referring now to the accompanying drawing, a schematic diagram of an alternating current voltage regulator embodying the invention is illustrated. Unregulated alternating current voltage is supplied to regulator input terminals 11 and 12 by an A.-C. source 13. The voltage received at the input terminals is supplied to the primary winding 15a of a transformer 15 which also has a pair of secondary windings 15b and 15c. One of the secondary windings 15b is connected directly to a pair of output terminals 17 and 18 which in turn are connected to an A.-C. load device 14 so that a regulated A.-C. output is provided thereat. The other secondary winding 15c is connected to a pair of output terminals 19 and 20 through a full wave rectifier network 21 and through a filtering network consisting of a resistor 22 and a capacitor 23, the terminals 19 and 20 in turn being connected to a D.-C. load device 16 so that a regulated D.-C. output is provided thereat.

Though the voltage regulator is illustrated for providing both a regulated A.-C. output and a regulated D.-C. output, it is to be understood that the invention is intended to cover the providing of a regulated A.-C. and/or D.-C. output.

In accordance with one of the features of the present invention, a full wave, variable impedance device is connected between the A.-C. source and the transformer primary winding for regulating the portion of the supply voltage provided across the primary winding so that a desired regulated A.-C. and/or D.-C. output is provided. More specifically, the output circuits of a pair of transistors are connected in series in bucking or oppositely poled relationship between the A.-C. source and the primary winding for allowing current to flow in opposite directions through the primary winding during alternate half cycles of the A.-C. supply voltage and for controlling the voltage developed across the primary winding.

As may be seen by reference to the drawing, the pair of transistors 25 and 26 are herein illustrated as PNP type transistors, each having a base, an emitter and a collector, respectively designated as $b$, $e$ and $c$. The emitter-collector circuits of the transistors are connected in back-to-back or bucking relationship so that they pass current in opposite directions and regulate the voltage developed across the primary winding of transformer 15.

In accordance with an aspect of the present invention, bypass means are associated with the transistor output circuits so that, when one transistor is conducting, the output circuit of the other transistor is bypassed and a circuit is completed between the A.-C. source and the primary transformer winding 15a. In the illustrated embodiment, diodes 28 and 29 are respectively connected across the emitter-collector circuits of transistors 25 and 26 for performing the bypassing function.

In accordance with another aspect of the present invention, control means are provided for regulating the emitter-collector conduction of transistors 25 and 26 in accordance with the amplitude of the output provided by the full wave rectified bridge network 21. Since the portion of the supply voltage provided across the transformer primary winding is dependent upon the voltage drop across transistors 25 and 26, these transistors appear as variable impedance devices. Accordingly, the control means regulates the impedance of the transistors 25 and 26. For this purpose, a NPN type control transistor 30, having a base, an emitter and a collector, respectively designated as $b$, $e$ and $c$, has its collector-emitter circuit connected between the bases and collectors of transistors 25 and 26, such collectors also being connected to ground. The collector-emitter circuit of the control transistor 30 is also powered by the A.-C. source 13, a positive potential being applied to the collector due to the forward biasing of the transistors 25 and 26 when these transistors are conducting.

Accordingly, it may be seen that the emitter-collector impedances of transistors 25 and 26, and thus the voltage drops thereacross, are determined by the amount of conduction of transistor 30, i.e., they are determined by the biasing of transistors 25 and 26 in response to conduction of transistor 30. As transistor 30 is rendered more and more conductive, the emitters of transistors 25 and 26 are driven more positive with respect to the bases, by the A.-C. source, so that, since they are PNP transistors, the voltage drop across the emitter-collector circuits thereof decreases correspondingly. Accordingly, the portion of the supply voltage provided across the primary winding of the transformer 15 increases. Conversely, when transistor 30 is conducting less and less, the emitters of transistors 25 and 26 are driven less positive with respect to the bases so that the voltage drop across the emitter-collector circuits thereof increases. Thus, a lesser portion of the supply voltage is provided across the primary winding of the transformer 15. Consequently, when the output of bridge network 21 is below the desired voltage level, transistor 30 is to be rendered more conductive and, when the output of bridge network 21 is above the desired voltage level transistor 30 is to be rendered less conductive.

It will be apparent then that, when the output of the A.-C. source 13 is such that terminal 12 is positive with respect to terminal 11 and transistor 25 is rendered conductive, current flows through the emitter-collector circuit of transistor 25, through the diode 29 and through the primary winding 15a. Likewise, when the output of the A.-C. source 13 is such that the terminal 11 is positive with respect to terminal 12 and transistor 26 is rendered conductive, current flows through the emitter-collector circuit of transistor 26 through the diode 28 and through the primary winding 15a.

For the purpose of controlling the conduction of transistor 30, a feedback network is provided which responds to the instantaneous output of the regulator produced by the bridge network 21. The feedback network includes a potentiometer or voltage divider network 32 which is connected across the output of the bridge network 21 and includes a PNP type transistor 33 which has its base connected to a potentiometer-slider or contact arm 32a. The collector of transistor 33 is connected to a negative D.-C. potential, designated as "V1," through a resistor 34 and the emitter thereof is connected to ground through a suitable voltage source, designated as "V2." Additionally, the collector of transistor 33 is connected to the base of transistor 30 through a diode 35 so that conduction of transistor 30 is regulated in accordance with conduction of transistor 33. The voltage source V2 biases the emitter of transistor 33 so that when the contact arm 32a is at a potential substantially less than the potential V2, i.e., when the output of bridge network 21 is substantially below the desired level, transistor 33 is rendered highly conductive. As a result, the collector thereof is driven to a positive potential substantially corresponding to the potential V2 and the base of transistor 30 is driven substantially positive with respect to the emitter thereof so that high conduction thereof is initiated. Accordingly, transistors 25 and 26 are rendered highly conductive so that they appear as extremely low impedances and substantially the entire A.-C. supply voltage appears across the primary winding of transformer 15.

When the potential at the contact arm 32a approaches the potential of the source V2, the conduction of transistor 33 decreases so that the potential at the collector thereof becomes less positive. Under these conditions, the transistor 30 becomes less conductive so that in turn transistors 25 and 26 become less conductive, i.e., the impedance of the transistors 25 and 26 increases and a greater voltage drop is developed thereacross. It follows that the portion of the supply voltage provided across the primary winding of transformer 15 decreases correspondingly so that the amplitude thereof levels off and the outputs induced in the secondary windings also level off at a desired maximum amplitude.

From the foregoing, it may be seen that the conduction of transistors 25 and 26, i.e., the impedance thereof is directly dependent upon the potential at the contact arm 32a which in turn is dependent upon the output of the bridge network 21. The output of the bridge network, in turn, is dependent upon the amplitude of the voltage developed across the primary winding of the transformer 15. Accordingly, the peak amplitude of the outputs provided between terminals 17 and 18 and between terminals 19 and 20 are limited by transistors 25 and 26 in response to operation of the feedback network.

It should be noted that if the potential at contact arm 32a ever equals or exceeds the bias on transistor 33, transistor 33 will be rendered nonconductive so that transistor 30 and transistors 25 and 26 are rendered nonconductive. Accordingly, the output voltage drops toward zero value so that the transistors are again rendered conductive.

A brief description of the overall operation of the voltage regulator may be helpful in understanding the present invention. Let it be assumed that operation begins when power is first applied to the voltage regulator and when zero charge is stored in capacitor 23. Under these conditions, the potential at contact arm 32a will be substantially ground potential so that maximum conduction will exist in transistor 33 and the collector thereof will be at the maximum positive potential for the circuit arrangement. Accordingly, maximum conduction will exist in transistor 30 so that transistors 25 and 26 are rendered highly conductive and substantially no voltage drop will exist thereacross. Thus, substantially the full A.-C. supply voltage will appear across the primary winding of the transformer 15 and a corresponding output voltage will be induced in the secondary windings thereof. As the output of the bridge network 21 approaches the desired maximum level, the potential at the contact arm 32a approaches the potential V2 so that the transistor 33 becomes less and less conductive and the potential at the collector becomes less and less positive. It follows that under these conditions the transistor 30 becomes less conductive so that transistors 25 and 26 also become less conductive, i.e., the impedance values thereof increase and the voltage drops thereacross increase correspondingly. At this time, the voltage developed across the primary winding 15a of transformer 15 is limited by the voltage drop across transistors 25 and 26 and, thus, the peak amplitudes of the outputs induced in the secondary windings 15b and 15c are limited.

As the operation progresses, the line voltage tends to decay so that the voltage provided across the transformer primary winding 15a drops correspondingly. Thus, the output of the bridge network 21 drops so that the potential at the contact arm 32a drops and transistor 33 again is rendered more conductive. As a result, transistor 30 in turn becomes more conductive so that a lesser voltage drop exists across transistors 25 and 26 and a greater portion of the supply voltage appears across the primary winding 15a. Eventually, substantially all the supply voltage appears across the primary winding 15a and remains so until such time, during the next half cycle of the A.-C. supply, that the potential at the contact arm 32a again begins to approach the potential V2.

With the potentiometer 32 connected directly across the bridge network output as set forth hereinabove, the output at the terminals 17 and 18 will take the form of a square wave signal when the amplitude of the A.-C. supply exceeds the desired maximum amplitude. It is often desirable to provide a regulated square wave output because it has a higher root mean square (R.M.S.) value for any peak value than the conventional sine wave output. However, in accordance with another aspect of the present invention, the voltage regulator may be modified so that a sine wave output is provided at the A.-C.

output terminals 17 and 18. For this purpose, a double pole, single throw switch 45 having contacts 45a and 45b is provided for connecting the potentiometer 32 directly across the output terminals 19 and 20 of the regulator D.-C. output rather than across the bridge network output, i.e., connecting potentiometer 32 in parallel with the capacitor 23 so that it is supplied by the filtered D.-C. output. Under these conditions, the impedance of the transistors 25 and 26 is varied at a slower rate through a smaller range over a number of line voltage cycles since the capacitor 23 filters the output of the bridge network 21 and the charge thereon is varied slightly about the peak value of the bridge network output. With this version, a higher average dissipation occurs in the transistors 25 and 26 than with the potentiometer connected directly across the bridge network output and the impedance of the transistors is slowly varied about a reference or bias level so that a sine wave output is provided at terminals 17 and 18 thus is supplied to the A.-C. load device.

For the purpose of isolating the base circuits of transistors 25 and 26 from each other, isolating diodes 37 and 38 are connected in series therewith. Additionally, for the purpose of providing return paths for collector current ($I_{co}$) when the collectors of transistors 25 and 26 are reverse biased and the emitters thereof are open circuited, bypass resistors 39 and 40 are connected between the emitters and bases of the transistors. It is often desirable to provide larger bypass resistors to increase the input impedance of the transistors. However, this must be done without disturbing the ability of the resistors to bypass collector current. For this purpose, diodes 41 and 42 may be connected in the emitter circuits of transistors 25 and 26 to increase the voltage across resistors 39 and 40 to allow for increasing the resistances thereof without disturbing the ability of the resistors to bypass the collector current.

I claim as my invention:

1. In a voltage regulator having an input circuit adapted to be connected to an A.-C. supply and having an output circuit, the combination which comprises a pair of transistors having their emitter-collector circuits connected in bucking relationship between the input and output circuits for regulating the effect of the A.-C. supply so that an output voltage is provided in the output circuit having an instantaneous amplitude determined by the impedances of the transistors, means for allowing current to bypass one transistor when the other is conducting, and feedback means associated with the output circuit for controlling the impedance of the transistors in accordance with the instantaneous output voltage provided, the transistors limiting the output to a desired level in response to operation of the feedback means.

2. In a voltage regulator having input terminals adapted for connection to an A.-C. supply voltage and output terminals adapted for connection to a load, the combination comprising a pair of transistors having their emitter-collectors each connected in series between the input and output terminals and poled to conduct emitter-collector current in respectively opposite directions, a unidirectionally conductive device connected across the emitter-collector of each of the transistors and poled to conduct current in a direction opposite to that conducted by the transistor, means for supplying a D.-C. current through the emitter base junctions of the transistors, and means responsive to departures of the output voltage appearing between the output terminals from a desired value for varying the bias current to correctively change the impedances presented by the transistors.

3. In a voltage regulator having an input circuit adapted to be connected to an A.-C. supply and having an output circuit, the combination which comprises a pair of transistors having their emitter-collector circuits connected in bucking relationship between the input and output circuits for regulating the effect of the A.-C. supply so that an output voltage is provided in the output circuit having an instantaneous amplitude determined by the impedances of the transistors, variable means for biasing the transistors so that desired impedances are presented thereby, a unidirectionally conductive device connected across the emitter-collector circuit of each transistor for conducting current in a direction opposite to that conducted by the associated transistor, and feedback means associated with the output circuit for controlling the biasing means in accordance with the instantaneous output voltage provided so that the transistors limit the output to a desired level.

4. In a voltage regulator having an input circuit adapted to be connected to an A.-C. supply and having an output circuit, the combination which comprises, a pair of transistors having input circuits and output circuits, the transistor output circuits being connected in bucking relationship between the regulator input and output circuits for passing current in opposite directions, means for producing an output voltage in the regulator output circuit having an instantaneous amplitude determined by the voltage drop across the transistors, feedback means associated with the regulator output circuit for applying a bias input signal to the transistor input circuits in accordance with the instantaneous amplitude of the output voltage provided so that the voltage drop across the transistors is regulated thereby and thus the regulator output is controlled thereby, means for presetting the feedback means to limit the output to a desired level, and means for causing current to bypass one transistor when the other transistor is conducting.

5. In a voltage regulator having an input circuit adapted to be connected to an A.-C. supply and having an output circuit, the combination which comprises, a pair of transistors having input circuits and output circuits, the transistor output circuits being connected in bucking relationship between the regulated input and output circuits for passing currents in opposite directions, means for producing an output voltage in the output circuit having an instantaneous amplitude determined by the voltage drop across the transistors, feedback means associated with the regulator output circuit for applying a bias input signal to the transistor input circuits in accordance with the instantaneous amplitude of the output voltage provided so that the voltage drop across the transistors is regulated thereby and thus the regulator output is regulated thereby, means for presetting the feedback means to limit the output to a desired level, and a diode connected across the output circuit of each transistor for causing current to bypass the associated transistor when the other transistor is conducting so that forward biasing of the associated, nonconducting transistor is prevented.

6. In a voltage regulator having an input circuit adapted to be connected to an A.-C. supply and having an output circuit, the combination which comprises, a pair of transistors having input circuits and output circuits, the transistor output circuits being connected in bucking relationship between the regulator input and output circuits for passing current in opposite directions, means for producing an output voltage in the regulator output circuit having an instantaneous amplitude determined by the voltage drop across the transistors, feedback means associated with the regulator output circuit for applying a bias input signal to the transistor input circuits in accordance with the instantaneous amplitude of the ouput voltage provided so that the voltage drop across the transistors is regulated thereby and thus the regulator output is controlled thereby, means for presetting the feedback means to limit the output to a desired level, means for causing current to bypass one transistor when the other transistor is conducting, and means for isolating the transistor input circuits.

7. In a voltage regulator having an input circuit adapted to be connected to an A.-C. supply and having an output circuit, the combination which comprises, a pair of transistors having input circuits and output circuits, the transistor output circuits being connected in bucking relationship between the regulator input and output circuits for passing current in opposite directions, means for producing an output voltage in the regulator output circuit having an instantaneous amplitude determined by the voltage drop across the transistors, feedback means associated with the regulator output circuit for applying a bias input signal to the transistor input circuits in accordance with the instantaneous implitude of the output voltage provided so that the voltage drop across the transistors is regulated thereby and thus the regulator output is controlled thereby, means for presetting the feedback means to limit the output to a desired level, means for causing current to bypass one transistor when the other transistor is conducting, and means associated with each transistor for providing a collector current return path when the collector of the associated transistor is reverse biased and the emitter thereof is open circuited.

References Cited by the Examiner

UNITED STATES PATENTS

| | | | |
|---|---|---|---|
| 3,068,392 | 12/1962 | Santelmann | 321—18 |
| 3,105,933 | 10/1963 | Proc | 323—22 |
| 3,152,299 | 10/1964 | Leney | 323—22 |
| 3,209,205 | 9/1965 | Olson | 317—33 |
| 3,254,240 | 5/1966 | Lambourn | 307—88.5 |

JOHN F. COUCH, *Primary Examiner.*

W. E. RAY, *Assistant Examiner.*